(No Model.)

J. J. POWER.
APPARATUS FOR MOLDING AND BLOWING GLASS BOTTLES, &c.

No. 522,671. Patented July 10, 1894.

Attest
M. F. Altemus
Wm. F. Hall

Inventor
John Joseph Power
by Watson malison &Co
Atty

United States Patent Office.

JOHN J. POWER, OF PITTSBURG, PENNSYLVANIA.

APPARATUS FOR MOLDING AND BLOWING GLASS BOTTLES, &c.

SPECIFICATION forming part of Letters Patent No. 522,671, dated July 10, 1894.

Application filed October 16, 1893. Serial No. 488,315. (No model.)

*To all whom it may concern:*

Be it known that I, JOHN JOSEPH POWER, a citizen of the United States, residing at Pittsburg, in the county of Allegheny and State of Pennsylvania, have invented certain new and useful Improvements in Apparatus for Molding and Blowing Glass Bottles and the Like, of which the following is a specification, reference being had therein to the accompanying drawings.

My invention relates to an apparatus for blowing and molding glass articles, such as bottles and the like. Its object is to provide a simple form of apparatus by which the work can be carried on accurately and expeditiously.

The invention includes the mold made of a body section, a neck and top section, adapted to be moved to and from a body section and it includes also a special form of blow pipe and other features hereinafter described and particularly pointed out in the claim.

Figure 1:
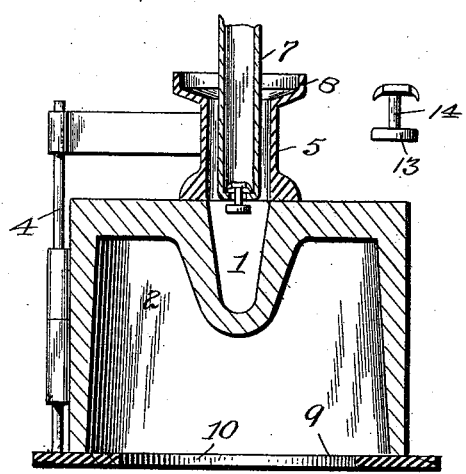
Figure 2:
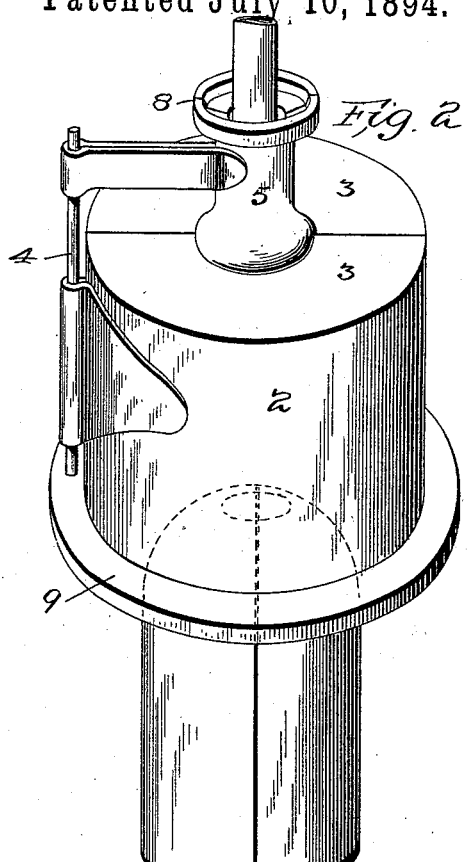

In the drawings, Figure 1— is a vertical sectional view through the entire apparatus. Fig. 2— shows the same in closed position and in perspective and Figs. 3— and 4— represent detail views.

Figure 3:
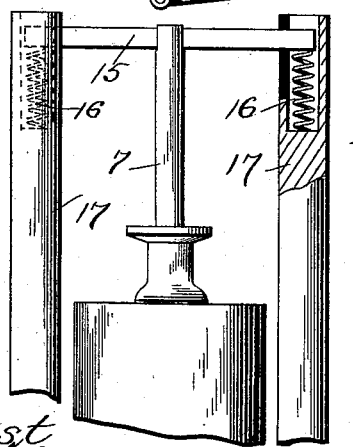
Figure 4:
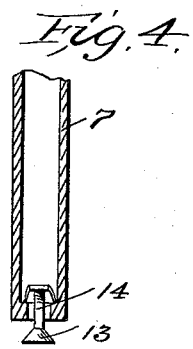

The glass from which the bottle is to be blown is first put in the conical cavity 1— of the main mold 2—, which is formed of sections 3—3 hung together and adapted to be thrown apart. The hinged post 4— to which the two parts of the main mold are pivoted supports also a neck mold 5— which is also formed in two parts, which are hung on the side post. After the main mold has been closed and the desired quantity of glass is deposited in the conical cavity, the two sections of the neck mold are swung together over the cavity so that the lower shoulder 6 of the neck mold will rest in said cavity. The blow pipe 7— is then introduced into the neck mold as shown in Fig. 3— and as it is of less diameter than the neck mold, the glass will be forced up said neck and will spread laterally around the enlarged head of the neck mold 8— thus completely forming the neck of the bottle and the top or rim with the attached bulb or bloom which is afterward blown and expanded to form the body of the bottle. The parts of the main mold rest upon a ring or plate 9— provided with a central opening 10.

After the blow pipe has been introduced and the neck and top of the bottle formed as described above, the parts of the main mold are swung open, leaving the mass of glass depending from the neck mold, and of the form of the conical cavity in the main mold. This mass therefore tapers downwardly and centrally over the opening 10— in the plate 9— and it is thus in proper position to enter the top of the bottom mold 11— when said mold is raised through the opening 10— in the plate.

Fig. 1— shows the mold in proper position below the main mold, when the same is closed and it shows also, a lever 12— by which the body mold can be forced up through the opening 10— to receive and inclose the tapering mass of glass hanging down from the neck mold. The body mold is made in sections hung together and these parts are arranged, so that when they are raised, they will receive and inclose the depending mass of glass. The body mold is raised until it contacts with the lower shoulder of the neck mold and then it incloses the glass and the operation of blowing a bottle is performed.

It will be understood, of course, that the opening in the plate 9— is of sufficient diameter to receive the body mold with its two sections swung slightly apart, so that said body mold may be raised while open to receive the mass of glass depending from the neck mold.

The blowing tube or plunger is provided with a valve or solid part at its lower end, consisting of a piece 13— having a stem 14— headed on its upper end within the tube, and adapted to allow the valve or head to move toward and from the end of the tube, so as to open and close the opening therein. When the blowing tube is first introduced into the mass of glass, this valve closes by reason of the downward pressure of the tube against the glass, and this prevents the molten material from rising within the tube, and thus clogging the same and rendering it useless. After the body mold has been lifted, however, and has inclosed the depending mass of glass, the blow tube is lifted slightly and the valve is then free to fall and when the air pressure is put on, the current of air can pass freely through the tube and out around the valve, thus blowing the glass to the size and shape of the body mold. When the tube is first introduced, it may be thrust sufficiently far into the cavity of the main mold to form a pocket in the depending mass of glass, and this will aid the subsequent operation of blowing.

The blow tube may be carried by a cross-bar 15— under tension of spring 16— in the posts 17— tending to lift the blow tube. After the glass has been blown to the size and shape of the body mold, the parts thereof may be separated and the parts of the neck mold likewise swung open and then the bottle removed and the operation repeated.

Having thus described my invention, what I claim as new, and desire to secure by Letters Patent of the United States, is—

In combination, the sectional main mold having a cavity in its upper part closed at the bottom by bringing the sections together, the sectional neck mold above the main mold, said molds being fixed in their vertical relation to each other and capable of having opening movement only, the sectional body mold arranged normally below the main mold and movable upwardly to occupy the position of the main mold when the latter is opened, and the combined plunger and blow tube consisting of the tube having the valve at its lower end, said blow pipe being arranged to be moved down through the neck in the main mold to force the glass up into the neck mold, substantially as described.

In testimony whereof I affix my signature in presence of two witnesses.

JOHN J. POWER.

Witnesses:
J. J. CRONIN,
JAS. A. CRONIN.